United States Patent Office 3,575,857
Patented Apr. 20, 1971

3,575,857
FLUOROCARBON POLYMER COMPOSITION HAVING SELF-LUBRICATING CHARACTERISTICS
Clair Warren Graver, King of Prussia, Pa., assignor to Pennsalt Chemicals Corporation, Philadelphia, Pa.
No Drawing. Filed Sept. 18, 1968, Ser. No. 760,674
Int. Cl. C10m 5/00
U.S. Cl. 252—12          5 Claims

ABSTRACT OF THE DISCLOSURE

A moldable self-lubricating fluorocarbon polymer composition is comprised of from about 40 to about 70 wt. percent of vinylidene fluoride polymer, from about 2 to about 40 wt. percent of particulated glass filler and from about 15 to about 35 wt. percent of telomers of the structure R—$(CF_2CF_2)_nX$ where R is perfluoroalkyl or monochloroperfluoroalkyl of one to four carbon atoms, X is chlorine, fluorine or iodine, and $n$ is an integer from 6 to 16. The composition is thermally molded to form sleeve bearings, ball joint sockets, and other bearing shapes.

---

This invention relates to a fluorocarbon polymer composition having self-lubricating characteristics. More particularly, this invention concerns a composition comprising a mixture of polyvinylidene fluoride, fluorocarbon telomers and particulated glass filler, which composition can be fabricated by conventional thermoplastics forming operations into various bearing shapes.

There is a great demand in the processing industries for self lubricated bearings which are constructed of relatively inert materials that will not contaminate the substances being processed, or where corrosive conditions, extreme temperatures, or inaccessibility to conventional lubrication are encountered. Attempts to meet these needs with bearings fabricated from polytetrafluoroethylene (PTFE) have not been altogether successful. Although PTFE bearings have generally adequate wear properties under light loads and at low rubbing velocities, PTFE creeps or cold flows under heavy loads and high rubbing velocities resulting in bearing deformation and failure. Another disadvantage of the PTFE products is their high cost of fabrication which involves preforming, sintering at around 340 to 440° C., followed by a slow cooling cycle. Moreover, precision parts must be machined to specifications from the sintered shapes.

In accordance with the present invention, a self-lubricating fluorocarbon polymer composition is provided comprised of a substantially uniform blend of from about 40 to about 70 percent by weight of vinylidene fluoride polymer, from about 2 to about 40 percent by weight of particulated glass filler and from about 15 to about 35 percent by weight of telomers of the structure R—$(CF_2CF_2)_nX$ where R is perfluoroalkyl or monochloroperfluoroalkyl radicals having one to four carbon atoms, X is chlorine, fluorine or iodine, and $n$ is an integer of from 6 to 16. The combined proportions of the foregoing three components in the composition will, of course, total 100 percent. The preferred ranges of the constituents of the compositions are about 55 to 65 percent polyvinylidene fluoride, about 10 to 20% particulated glass and about 25 to 30 percent fluorotelomers.

The compositions of this invention can be readily fabricated into useful shapes, even having precision tolerances, such as sleeve bearings, ball joint sockets, gears, cams, bushings and the like articles by conventional and inexpensive plastics forming techniques, e.g., injection molding, compression powder molding and transfer molding. The molding process is carried out in the comparatively moderate temperature range of about 165° C. to about 225° C. The composite, self-lubricating bearings thus formed exhibit exceptionally low wear rate and good dimensional stability even when subjected to heavy loads and high rubbing velocities. Bearings comprised of the three components embodied herein but in proportions falling outside of the foregoing ranges show a significantly higher wear rate compared to the claimed compositions.

The terms "vinylidene fluoride polymer" and "polyvinylidene fluoride" used herein are meant not only to refer to the normally solid high-molecular weight homopolymers of vinylidene fluoride but also to the normally solid high-molecular weight copolymers of vinylidene fluoride containing a predominance of vinylidene fluoride units, for example, copolymers with up to about 30 mole percent of such comonomers as tetrafluoroethylene, trifluoroethylene, vinyl fluoride, 1-chloro-1,2,2-trifluoroethylene, sym.-dichlorodifluoroethylene, hexafluoropropene, and others known in the art, the copolymers having essentially the same properties as the homopolymer with regard to its presently disclosed utility.

The particulated glass filler embodied in the present composition may be chosen from a variety of well known and commercially available materials, preferably for example, glass micro-beads which are glass spheres having diameters within the range of about 5 to 50 microns, glass fibers having fiber diameters of about 3 to 12 microns, and other forms of glass powders and glass chips.

The fluorotelomers embodied in the present composition, R—$(CF_2CF_2)_nX$, are also known materials. The telomers are wax-like substances which have melting point ranges on the order of about 100° C. to about 200° C. Preferred are the telomers mixtures described by M. Hauptschein and M. Miville in U.S. Pat. No. 3,345,424, the disclosure of which is hereby incorporated by reference.

The examples next presented are set forth to illustrate the invention and not in any way to limit its scope as previously defined.

The blended compositions were prepared by coagulating measured amounts of latexes of polyvinylidene fluoride (prepared according to the method described by M. Hauptschein in U.S. 3,193,539) in the presence of measured amounts of fluorotelomer wax and particulate glass filler, using a shear type mixing apparatus. The fluorotelomer wax had a melting point range ca. 105–150° C. and was a mixture of telomers of varying chain length with the following structure:

$(CF_3)_2CF(CF_2CF_2)_nX$ where X is chlorine or iodine and where $n=$

| $n$ | Percent |
|---|---|
| 6 | 28–36 |
| 7 | 25–39 |
| 8 | 17–20 |
| 9 | 9–11 |
| 10 | 5–8 |
| 11 | 2–4 |
| 12 | 1–2.2 |
| 13 | 0.1–2 |
| 14–16 | 0.2–1 |

The mixture was filtered and the solids washed with water and methanol to remove traces of surfactant present in the polymer latex. The blends were dried in a vacuum oven at 70° C.

Test bearings were prepared by compression molding the foregoing powder blends at 6000 p.s.i. and 225° C. into cylinders 1¼ inches in diameter and 3 inches in length. Bearing specimens were cut from these cylinders with a 0.6875 inch curved radius to give a uniform contact between the specimen and the wear ring (described below) with a contact surface area of 0.1777 square inch. The efficiency of the bearing composition was determined by measuring the "PV" limit and wear characteristics of the material at various velocities and loads when a wear ring was in contact with the test specimen as described below. "PV" is the product of pressure in pounds per square inch (p.s.i.) and velocity in feet per minute (f.p.m.). The evaluations were carried out using a Dow-Corning Friction and Wear Testing Machine, Alpha Model LFW–1, marketed by the Dow Corning Corporation. The test specimen was mounted in a stationary test block which was in contact with a rotating cylindrical SAE 4620 steel wear ring having a 15 RMS finish, 58–63 Rc at room temperature and dry. The friction force was recorded by means of a load cell-recorder. The temperature was measured by a thermocouple embedded in the test specimen. Each test was conducted using a new wear ring; all parts were wiped clean with trichloroethylene. The test was started with a 30 minute break-in period at 30 pounds (168 p.s.i.) load and 30 f.p.m. velocity. The load was increased by step-loading in 30 pounds increments every 20 to 30 minutes until failure of the test specimen occurred. This failure was determined by carefully monitoring the change in friction torque and temperature after each step loading. When the torque and/or temperature failed to stabilize, a failure of the specimen was noted. The "PV" limit value was defined as the highest plateau at which equilibrium occurred. The change in friction force was much more indicative of failure than a change in temperature, with erratic or rapidly rising friction force readings denoting failure, at which point the test was stopped. The wear characteristics were determined on a fresh spcesimen using the same test machine. The runs were made at 5,000 PV (168 p.s.i., 30 f.p.m.) or 10,000 PV (336 p.s.i., 30 f.p.m.). The specimen was weighed at 8 hour intervals with the run terminated after about 2 days. The wear factors were calculated in the following manner:

Weight loss was converted to volume loss by the formula $$VL = \frac{WL}{D}$$

where $D$=density (gm./cm.$^3$). The density of the specimen was determined by ASTM method D 792–64T. The wear factor K (cu. in.-min./lb.-ft.-hr.) was calculated using the formula $V = KFVT$, where $V$=volume loss (cu. inches), $F$=load (lbs.), $V$=distance traveled (ft./min.), and $T$=time (hr.).

The following table presents test data showing the superiority of the self-lubricating compositions of this invention compared to compositions wherein one of the essential components is not present.

| Example No. | Bearing composition in weight percents of described components | | | PV limits (average) f.p.m.×p.s.i. | Wear factor | Observations and remarks on bearing performance |
|---|---|---|---|---|---|---|
| 1 | 100% A | | | 7,500 | 700×10$^{-10}$ at 5,000 PV | Unacceptable, gross spalling and high wear. |
| 2 | 98% A | 2% B | | 7,500 | do | Unacceptable, spalling and high wear. |
| 3 | 87% A | 13% B | | 7,500 | Not calculated because of specimen deformation. | Unacceptable, spalling and deformation. |
| 4 | 63% A | 27% B | 10% D | 25,000 | 22×10$^{-10}$ at 10,000 PV | Good results. |
| 5 | 63% A | 27% B | 10% E | 30,000 | 23×10$^{-10}$ at 10,000 PV | Do. |
| 6 | 56% A | 24% B | 20% D | 25,000 | 25×10$^{-10}$ at 10,000 PV | Do. |
| 7 | 49% A | 21% B | 30% D | 25,000 | 110×10$^{-10}$ at 10,000 PV | Do. |
| 8 | 63% A | 27% C | 10% D | 10,000 | 55×10$^{-10}$ at 5,000 PV | Acceptable. |

NOTE.—Components: A=Vinylidene fluoride polymer; B=Fluorotelomers of structure (CF$_3$)$_2$CF(CF$_2$CF$_2$)$_n$Cl; C=Fluorotelomers of structure (CF$_3$)$_2$CF(CF$_2$CF$_2$)$_n$I; D=Glass fibers (Johns Manville vitro strand Type G fiber glass, 12 micron fibers); E=Glass micro-beads (Potters Bros. Inc. soda lime glass, size 3000, 6 to 50 microns spheres).

Similar results as the foregoing are observed when fluorotelomer fluorides are substituted for the fluorotelomer chlorides and iodides components of the preceding examples. However, when other fillers such as finely-divided graphite, carbon, and metallic fillers, e.g., copper or bronze powders, are substituted for the glass fillers, the bearings are deficient in performance, probably due to the weak cohesive forces resulting in poor structural integrity.

I claim:
1. A composition comprised of a blend of from about 40 to about 70% by weight of vinylidene fluoride polymer selected from the group consisting of normally solid high-molecular weight homopolymers of vinylidene fluoride and normally solid high-molecular weight copolymers of vinylidene fluoride containing up to about 30 mole percent of a comonomer, from about 2 to about 40% by weight of particulated glass filler and from about 15 to about 35% by weight of telomers having the structure R—(CF$_2$CF$_2$)$_n$X where R is perfluoroalkyl or monochloroperfluoroalkyl of one to four carbon atoms, X is chlorine, fluorine or iodine, and $n$ is an integer from 6 to 16.

2. The composition according to claim 1 where X is chlorine.

3. The composition according to claim 1 where X is iodine.

4. The composition according to claim 1 comprised of 55 to 65% vinylidene fluoride polymer, 10 to 20% glass filler and 25 to 30% of the fluorotelomers.

5. A fabricated article prepared by the heat and pressure molding of the composition of claim 1.

References Cited

UNITED STATES PATENTS 3,193,539  7/1965  Hauptschein _____ 260—87.7
3,257,317  6/1966  Bre et al. _____ 252—12
3,345,424  10/1967  Hauptschein et al. ___ 252—58X DANIEL E. WYMAN, Primary Examiner C. F. DEES, Assistant Examiner U.S. Cl. X.R.
252—12.4, 58